(12) United States Patent
Kalhan et al.

(10) Patent No.: US 7,231,227 B2
(45) Date of Patent: Jun. 12, 2007

(54) SYSTEMS AND METHODS FOR BLIND SOURCE SEPARATION OF WIRELESS COMMUNICATION SIGNALS

(75) Inventors: Amit Kalhan, La Jolla, CA (US); Ramon Khalona, Carlsbad, CA (US); Henry Chang, San Diego, CA (US); Doug Dunn, Chula Vista, CA (US); Richard J. Camarillo, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 409 days.

(21) Appl. No.: 10/929,847

(22) Filed: Aug. 30, 2004

(65) Prior Publication Data

US 2006/0046672 A1    Mar. 2, 2006

(51) Int. Cl.
  *H04B 1/38*  (2006.01)
  *H04M 1/00*  (2006.01)
(52) U.S. Cl. .................... 455/552.1; 455/137; 455/324
(58) Field of Classification Search ............. 455/552.1, 455/132, 137, 188, 189.1, 190.1, 283–284, 455/304–305, 311–312, 313–315, 323–324
See application file for complete search history.

(56) References Cited

U.S. PATENT DOCUMENTS

| | | | |
|---|---|---|---|
| 5,706,402 A | 1/1998 | Bell | |
| 5,959,966 A | 9/1999 | Torkkola | |
| 6,608,859 B2 | 8/2003 | De et al. | |
| 6,625,203 B2 | 9/2003 | De et al. | |
| 6,642,887 B2* | 11/2003 | Owechko | 342/373 |
| 7,047,043 B2* | 5/2006 | Reilly et al. | 455/561 |
| 7,098,849 B2* | 8/2006 | Goldberg | 342/383 |
| 7,133,657 B2* | 11/2006 | Kuenen et al. | 455/324 |
| 7,133,699 B1* | 11/2006 | Owechko et al. | 455/562.1 |

OTHER PUBLICATIONS

Abrard, et al., "From blind source separation to blind source cancellation in the underdetermined case: A new approach based on time-frequency analysis", University Paul Sabatier, France, University of Southampton, England, pp. 734-738 and add'l figure pg. (figs. 7-17).

Hyvarinen, et al., "Independent Component Analysis: A Tutorial", University of Technology, Finland, pp. 1-21, Apr. 1999.

* cited by examiner

*Primary Examiner*—Nguyen T. Vo

(57) ABSTRACT

A multi-mode receiver and methods are provided, which use blind source separation (BSS) analysis to distinguish the various wireless communication signals from each other. Specifically, different signal types can be identified by BSS. The different signal types can be in overlapping frequencies or they can be in completely different frequencies. The BSS analysis may use center or carrier frequency, bandwidth, modulation scheme, access scheme, or wireless communication resources as an input to assist in the BSS.

15 Claims, 4 Drawing Sheets

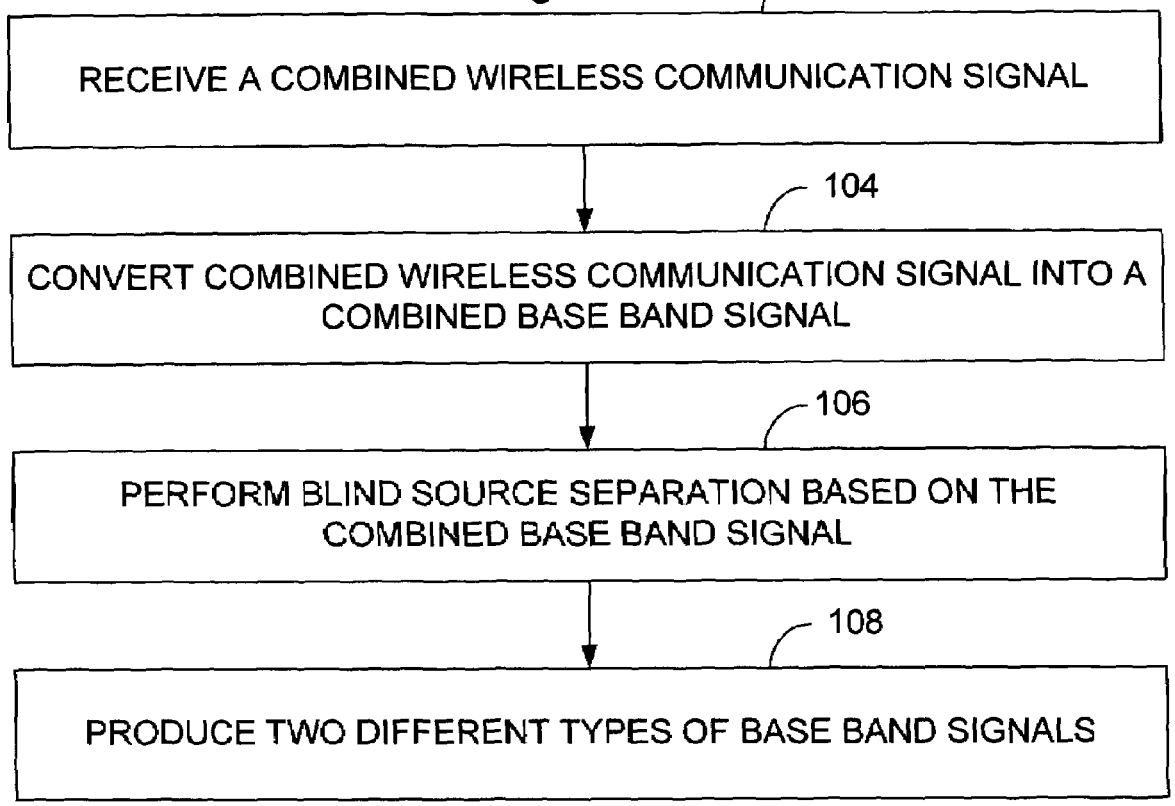
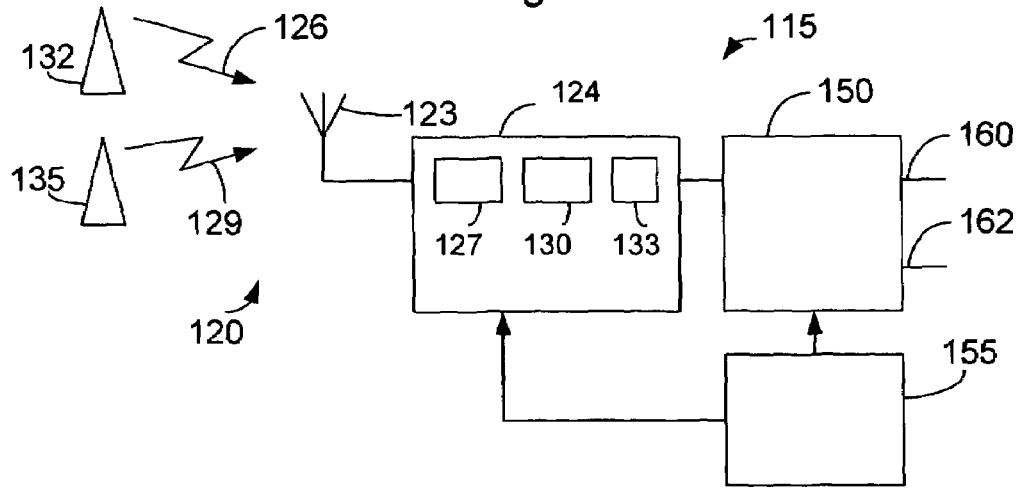

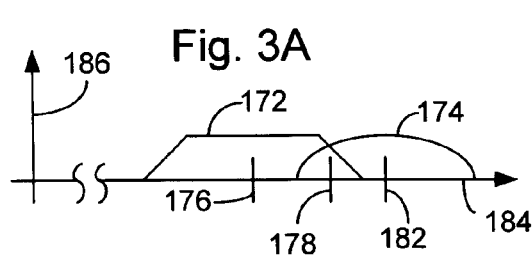
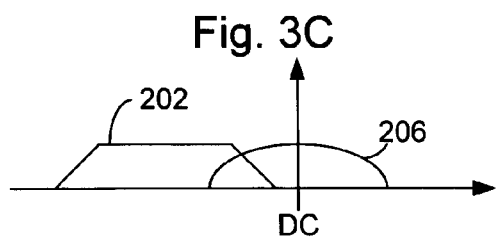
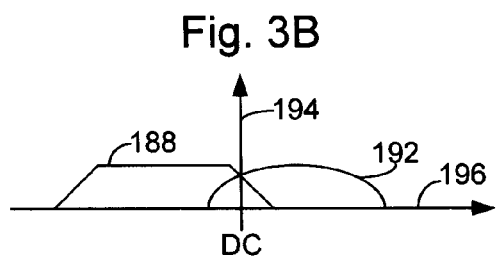
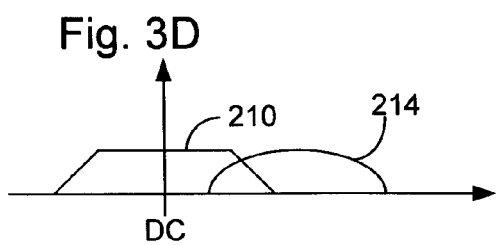
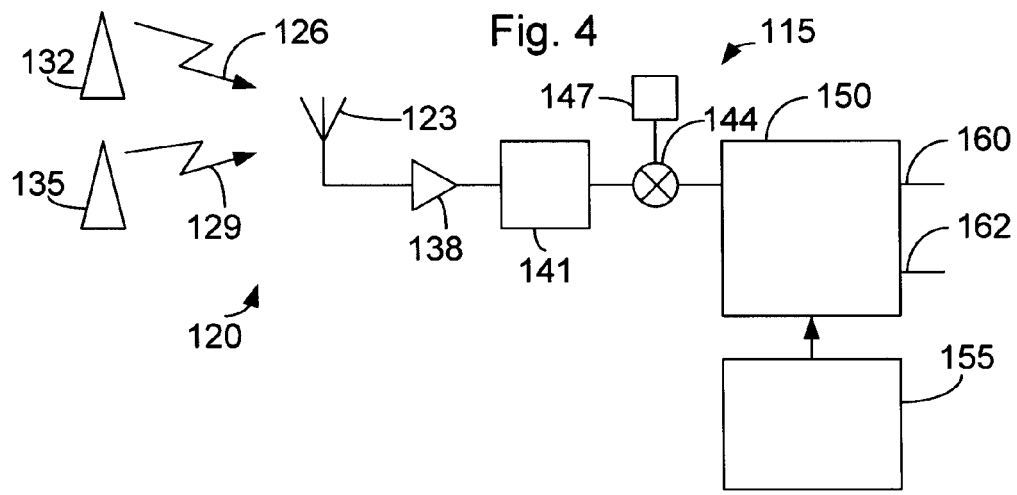
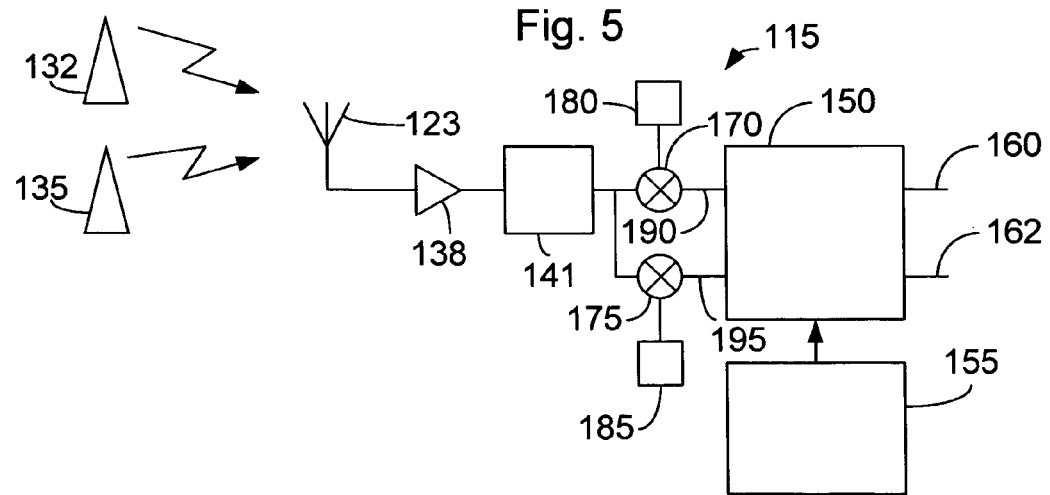

SYSTEMS AND METHODS FOR BLIND SOURCE SEPARATION OF WIRELESS COMMUNICATION SIGNALS

BACKGROUND OF THE INVENTION

1. Field of the Invention

The invention relates generally to wireless communication and more particularly to systems and methods for multi-mode wireless communication.

2. Background

The wireless communication spectrum is becoming increasingly crowded. Specifically, more and more communication users and more and more communication types are utilizing the limited frequency spectrum that is available. Reception of wireless communication becomes increasingly difficult as more users and types of communications increasingly consume the available communications spectra.

Some communication types occupy overlapping frequency bands. For example, wireless local area networks (WLAN) and wireless personal area networks (WPAN) sometimes occupy the same frequency and space. For example, the communication standards known as 802.11b and g (hereinafter collectively, "802.11") operate at approximately 2.4 gigahertz (GHz), while the communication standard known as Bluetooth also operates at approximately 2.4 GHz. See IEEE Std 802.11b, IEEE Std 802.11g and IEEE Std 802.15 (hereinafter, "Bluetooth"), all published by The Institute of Electrical and Electronics Engineers, Inc., New York, N.Y., 1999 (Reaff 2003). It is commonly very difficult if not impossible for wireless communication receivers to differentiate between 802.11 and Bluetooth communications.

It would be convenient to allow Bluetooth and 802.11 systems to operate within the same physical location. But the 802.11 and Bluetooth communications interfere with each other, making it nearly impossible to receive either the 802.11 communication or the Bluetooth communication or both while communication of both types are being transmitted in close proximity. A possible solution is to turn off the 802.11 communications in certain time periods, to allow for Bluetooth communication to proceed without interference during those time periods. However, this approach would decrease the communication capacity of the 802.11 communication and the Bluetooth communication.

Typically, for a wireless communication device to receive wireless communication signals in multiple bands (or frequencies) the device must have multiple receiver architectures. That is, for example, the device typically must have two low noise amplifiers (LNA's) and two radio frequency (RF) filters in order to receive signals in two bands. For example, a wireless communication device may be able to receive signals in both the U.S. cellular band between approximately 824 MHz and 894 MHz, and the U.S. personal communication service (PCS) band between approximately 1910 MHz and 1990 MHz . Such a device would have a cellular LNA and a separate PCS LNA in addition to a cellular RF filter and a separate PCS RF filter. The LNA's and RF filters are narrowband devices. This means that they work especially well at their designated signal frequency, but that they do not work well at other frequencies or that they reject signals at other frequencies. Additionally, typical multi-band receivers operate by receiving and processing signals in one band at a time. For example, typical mobile telephones in the United States can only receive data in either the cellular band or the PCS band at any given time. These devices cannot operate in the cellular band and the PCS band simultaneously.

Another part that may be duplicated in some multi-band receivers is the antenna. Some receivers require multiple antennas to receive multiple bands. Indeed, some receivers require multiple antennas even to receive signals from multiple sources in the same band.

SUMMARY OF THE INVENTION

In order to overcome the problems associated with conventional approaches for receiving wireless communication, a multi-mode receiver and methods are provided, which use Blind Source Separation (BSS) analysis to distinguish the various wireless communication signals from each other. Specifically, different signal types can be identified by BSS. This is advantageous especially when spectra of different signal types overlap, such as is the case for 802.11 and Bluetooth.

Advantageously, a better signal to noise ratio may be achieved by using BSS to separate different signal types from each other. This can result in several related advantages. For example, signal acquisition may be improved because the BSS process may lead to faster acquisition or enhanced signal quality during acquisition (i.e., higher signal-to-noise ratio) when the component signals are property identified with reduced mutual interference. As another example, hand-offs between communication types may be improved, because both signal types may be acquired simultaneously where previously that was impossible or prohibitively costly. Further advantages may include reduction in component count to accommodate different communication types and the ability to use wide-band RF parts such as filters and amplifiers and less complicated analog to digital converters. Cost, size and manufacturing savings may be achieved.

Other aspects, advantages, and novel features of the invention will become apparent from the following Detailed Description, when considered in conjunction with the accompanying drawings.

BRIEF DESCRIPTION OF THE DRAWINGS

Preferred embodiments of the present inventions taught herein are illustrated by way of example, and not by way of limitation, in the figures of the accompanying drawings, in which:

FIG. 1 is a flow diagram illustrating a method for performing blind source separation based on a combined base band signal.

FIG. 2 shows a block diagram illustrating a system and a receiver including a blind source separation module for identifying at least two separate communication signals having at least two separate communication types.

FIG. 3A shows a spectral plot of two overlapping RF signals.

FIGS. 3B-3D show spectral plots of base band signals downconverted from the RF signals whose spectral plots are shown with respect to FIG. 3A.

FIGS. 4-7 show block diagrams illustrating systems and a receivers including a blind source separation module for identifying at least two separate communication signals having at least two separate communication types.

DETAILED DESCRIPTION

Figure 6:
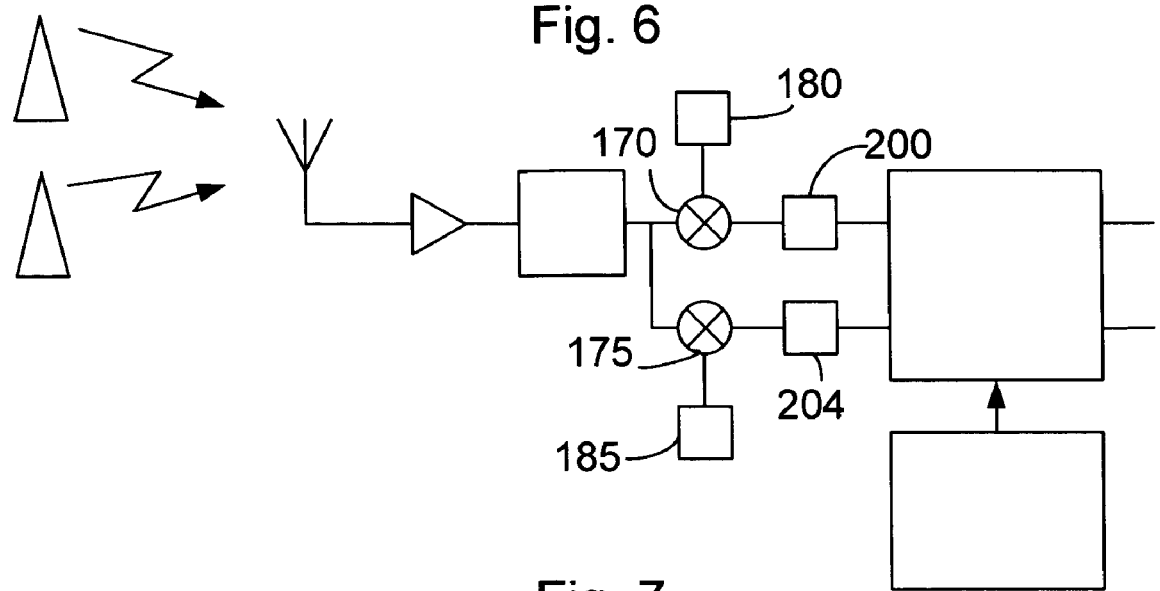

Hyvarinen and Oja give an overview of independent component analysis (ICA) in Independent Component Analysis: A Tutorial, Aapo Hyvarinen and Erkki Oja, Helsinki University of Technology Laboratory of Computer and Information Science, P.O. Box 5400, FIN-02015 Espoo, Finland, April 1999. ICA is a type of blind source separation (BSS). As described by Anthony J. Bell in U.S. Pat. No. 5,706,402, entitled Blind Signal Processing System Employing Information Maximization to Recover Unknown Signals Through Unsupervised Minimization of Output Redundancy, which is incorporated in its entirety herein by reference, non-linear functions g(x) can be used to transform a set of inputs x to have a preselected probability density function corresponding to a set of outputs y. Bell, col. 10, lines 11-17. As discussed in Bell, a parameter, w, of the function g(x) is varied to minimize the information redundancy in the outputs y or to maximize the information in the outputs y.

Kari Torkkola, in U.S. Pat. No. 5,959,966, entitled Methods and Apparatus for Blind Separation of Radio Signals, which is incorporated in its entirety herein by reference, describes applying blind source separation techniques to multiple users' signals received at a base station in a cellular wireless communication system. Torkkola, col. 3, lines 21-39. In Torkkola's system, many users transmit to a base station over the same frequency and using the same modulation technique, for example, in code division multiple access (CDMA) cellular communications. Torkkola, col. 3, lines 21-36. Torkkola describes receiving the many users' signals via multiple antennas at the base station. The many users' signals are then processed via blind source separation techniques. Specifically, Torkkola describes producing an adaptation equation (similar to Bell's function g(x)) based on the probability density function of the signal used by the many users.

Blind source separation techniques can be applied to signals that may be completely different signal types. For example, 802.11 signals can be separated from Bluetooth signals.

Abrard, et al. describe a way of performing BSS when the number of inputs M is less than the number of signal sources N. See "From Blind Source Separation to Blind Source Cancellation in the Underdetermined Case: A New Approach Based on Time-Frequency Analysis", Frederic Abrard, Yannick Deville and Paul White, Proceedings of the 3rd International Conference on Independent Component Analysis and Signal Separation (ICA'2001), pp. 734-739, San Diego, Calif., Dec. 9-13, 2001. Abrard, et al. applied Time-Frequency analysis to audio signals. Abrard, et al. need "the sources to be non-stationary and to have some differences in their time-frequency representations." Abrard, et al., at p. 237, col. 2. "[N]o assumption is made about the gaussianity, coloration or independence of the sources." Id.

Abrard, et al. perform the following steps. Each signal $x_i(t)$ is multiplied by a Hanning window function $h(T-t)$. The running time is represented by T and the fixed time is represented by t. The result is a modified signal $x_i(t, T)=x_i(T)h(T-t)$. Next, the short time Fourier transform is taken of each modified signal, $x(t, T)$, resulting in Fourier transforms $X_i(t,\omega)$. The ratio $\alpha_i(t,\omega)$ of $X_1(t,\omega)$ to $X_2(t,\omega)$ is taken. The mean and variance, respectively, of the ratio $\alpha_i(t,\omega)$ are defined as:

$$\bar{\alpha}(\Gamma_k, \varpi_j) = \frac{1}{M} \sum_{i=1}^{M} [\alpha(t_i, \varpi_j)]; \quad (1)$$

$$\mathrm{var}[\alpha(t, \varpi_j)]_{(\Gamma_k, \varpi_j)} = \frac{1}{M} \sum_{i=1}^{M} [(\alpha(t, \varpi_j) - \bar{\alpha}(\Gamma_k, \varpi_j))^2]; \quad (2)$$

Abrard, et al. state:

"If e.g. $S_2(t_i,\omega_j)=0$ for these M windows, then . . . [the] variance is equal to zero. Conversely, if both $S_1(t_i,\omega_j)$ and $S_2(t_i,\omega_j)$ are different from zero AND non constant values over $(\Gamma_1,\omega_i)$, then [the variance] is significantly different from zero.

"So by searching for the lowest value of expression [(2)] vs all the available series of windows $(\Gamma_i,\omega_i)$, we directly find a time-frequency domain $(\Gamma_i,\omega_i)$ where only one source is present. The corresponding value of c to cancel this source is then given by the mean computed in Equ. [(1)]. ["c" is the separating coefficient in a two source, one sensor BSS problem].

"To find the second separating coefficient, we just have to check the next lowest value of the variance vs $(\Gamma_i,\omega_i)$ which gives a significantly different c. A difference of $10^{-1}$ is a good practical value, allowing hard mixtures, where both separating coefficients $c_1$ and $c_2$ are of similar range.

Abrard, et al. at p. 736, col. 1. Note that $S_1$ and $S_2$ are the short time Fourier transforms of source signals $s_1$ and $s_2$, respectively.

As stated by Abrard, et al., the above procedure can be applied to the case where the number of sources N is greater than the number of combined signals observed. In that case, $$x_1(t) = \sum_{m=1}^{N} a_{1m} s_m(t); \quad (3)$$

and $$x_2(t) = \sum_{n=1}^{N} a_{2n} s_n(t); \quad (4)$$

The complex ratio becomes:

$$\alpha(t, w) = \frac{\sum_{m=1}^{N} a_{1m} S_m(t, \varpi)}{\sum_{m=1}^{N} a_{1m} S_m(t, \varpi)}; \quad (6)$$

Wherever in the time-frequency window $(t_i,\omega_j)$ only one source k exists, the denominator of equation (6) becomes approximately equal to one (1) and $\alpha(t,w)$ represents the unmixing coefficient to cancel that source. Other sources can be cancelled by finding other windows with only one source.

Referring now to FIG. 1, a process for separating at least two different types of sources from a combined RF signal will now be described. FIG. 1 illustrates a logical flow diagram for separating different signal types from each other. In step 102, a combined wireless communication signal is received. The combined wireless communication signal includes component wireless communication signals from more than one wireless communication type. For example, a first component wireless communication signal might be an 802.11 signal. A second component wireless communication signal might be a Bluetooth signal. As another example, a first component wireless communication signal might be a U.S. PCS signal, while a second component wireless communication signal might be a U.S. cellular signal.

In step 104, the combined wireless communication signal is converted into a combined base band signal. The combined base band signal is a signal at or near the base band signal frequency of at least one of the component wireless communication signals. The combined base band signal theoretically contains base band data from at least two of the component wireless communication signals. However, most of the data from one of the component signals may be lost due to the conversion to base band. This would particularly be true in the case where the two component signals are at different frequencies. In that case, the conversion to base band would primarily select base band data for only one of the signals.

For example, if the two component signals are U.S. cellular at 824 to 894 MHz and U.S. PCS at 1910 to 1990 MHz, then the downconversion to base band would primarily select either the cellular base band data or the PCS base band data, depending upon what local oscillator frequency was used to convert to base band.

In other circumstances, a large portion of the data for both component signals may be present in the combined base band signal. Example RF spectra and base band spectra will be described below with respect to FIGS. 3A-3D. For example, if the two component signals are 802.11 signals at 2.4 GHz and Bluetooth at 2.4 GHz, then both component signals will be substantially represented in the combined base band signal.

In step 106, blind source separation is performed based on the combined base band signal. Blind source separation is particularly advantageous when, as described above, more than one component signal is substantially represented in the combined base band signal.

Knowledge of the signal characteristics are included as inputs to the blind source separation. Any useful method of blind source separation can be employed, as described, for example, by Hyvarinen et al., Bell and Torkkola. Especially, it may be useful to use knowledge of the probability density function of the possible signal types to produce the unmixing matrix. Specifically, knowledge of the modulation scheme, multiple access scheme, center or carrier frequency, bandwidth, time-dependent changes, power, and wireless resource, such as, for example, pseudorandom noise (PN) code or time slot, can be used.

In step 108, at least two different types of base band signals are produced as an output of the blind source separation. The different types of base band signals include: signals with different modulation schemes, such as, for example, quadrature phase shift keying (QPSK) or 16-ary quadrature amplitude modulation (16-QAM); signals with different center or carrier frequencies; signals with different bandwidths; signals with different time designations, such as, for example, signals that may be off at certain times of the day; signals with different wireless resources, such as, for example, different PN codes, such as in cellular CDMA communications, or different time slots, such as in time division multiple access (TDMA) cellular communications.

More than two base band signals may be produced by the BSS. Specifically, the BSS may separate the combined base band signal into N base band signals, where N is the number of signal components.

In the case of different center or carrier frequencies, the carrier frequency is intended in conventional carrier systems, whereas for systems like ultra wide band (UWB), which does not use a carrier frequency, the center frequency is intended, meaning the center frequency of its occupied spectrum.

The methods of FIG. 1 will be described in more detail with respect to FIG. 2. FIG. 2 shows a block diagram of wireless communication receiver 115 and system 120. Receiver 115 has antenna 123 for receiving component wireless communication signals 126 and 129 over the air. Signals 126 and 129 are sent by signal sources 132 and 135, respectively. Signal sources 132 and 135 are transmitters for different types of communications. For example, signal source 132 may transmit 802.11 signals while signal source 135 may transmit Bluetooth signals. The 802.11 signals interfere with the Bluetooth signals and the Bluetooth signals interfere with the 802.11 signals. Advantageously, receiver 115 can distinguish the 802.11 signals from the Bluetooth signals.

Antenna 123 is connected to downconversion block 124. Downconversion block 124 represents three separate functions. First, downconversion block represents RF circuit block 127. RF circuit block 127, may, for example, be a low noise amplifier (not specifically shown with respect to FIG. 2). Second, downconversion block 124 represents downconverter 130. Downconverter 130 converts the combined RF signal to a combined base band signal. Downconverter 130 may include a complex mixer. That is, the RF signal may be split into two orthogonal base band signals. The first of the orthogonal signals is mixed with a local oscillator signal of a designated center or carrier frequency. The second of the identical signals is mixed with a local oscillator signal at the same center or carrier frequency but which is shifted by pi/2 radians of the center or carrier frequency. The result is two base band signals that are shifted from each other by pi/2 radians of the center or carrier frequency. This is called complex mixing.

Third, downconversion block 124 represents analog to digital converter (ADC) 133. ADC 133 converts the combined analog RF signal or combined analog base band signal into a digital signal. Downconverter 130 and ADC 133 may be in either order in the signal path. Typically, analog to digital conversion occurs after the downconversion. However, as ADC speeds are improving, it may presently be possible, or it may soon be possible, to perform the analog to digital conversion before the downconversion. Further, some ADC methods in the future may combine downconversion and ADC into one step.

Downconversion block 124 is connected to Blind Source Separation (BSS) module 150. BSS module may be part of a processor (not shown) in receiver 115. BSS module 150 may take the form of software, or machine instructions, residing in memory (not shown) connected to a processor in receiver 115.

BSS module 150 is connected to communication signal type indicator (CSTI) module 155. CSTI module 155 may be a system identification (SID) module. CSTI module 155 contains system information about the wireless signals that are input to the receiver, such as, for example, frequencies of operation, bandwidths, modulation schemes, and multiple access schemes.

Similar to BSS module, CSTI module 155 may be part of a processor or take the form of software or machine instructions in memory, which are executed by a processor.

BSS module 150 outputs at least two base band signals of different types, as indicated by output lines 160 and 162.

Output lines 160 and 162 would be connected to an appropriate base band processor or processors (not shown). For example, line 160 might be connected to an 802.11 base band demodulator, and line 162 might be connected to a Bluetooth base band demodulator. The base band demodulators, BSS module, and CSTI module may be implemented as part of the same processor or as one or more different processors, or as software running on one or more processors. It is also possible for there to be more than two outputs 160 and 162. Two outputs are shown as a minimum only, and not as a maximum.

Receiver 115 may be implemented as part of a mobile wireless communication device, such as a mobile phone (not shown). In that case, the mobile phone would be compact, have a portable power supply, a case, a user interface including a keypad, a microphone and a speaker, and be able to transmit in at least one communication signal type. The mobile phone could be a CDMA mobile phone, including a transmitter which may be connected to antenna 123.

The downconversion of two RF signals with overlapping spectra will now be described with respect to FIGS. 3A-3D. FIG. 3A shows a spectrum plot of two RF signal spectra 172 and 174. Frequency 184 is plotted against spectral intensity 186. Signal spectrum 172 has center frequency 176. Signal spectrum 174 has center frequency 182. An average frequency 173 is also shown. Average frequency 178 represents a half way point of the overlap region of signal spectra 172 and 174. It will be appreciated that other average frequencies could be used. For example, an average frequency could be chosen as an average of center frequencies 176 and 182.

FIG. 3B shows a spectral plot of component base band signals after downconversion. Specifically, the signal represented by signal spectrum 174 has been down converted to produce signal spectrum 192, and the signal represented by signal spectrum 172 has been downconverted to produce base band signal spectrum 188. The downconversion has been performed by frequency shifting by an amount equal to frequency 178, shown with respect to FIG. 3A.

FIGS. 3C and 3D are similar to FIG. 3B, except that the spectra in FIG. 3A have been shifted by different amounts. Spectra 202 and 206 in FIG. 3C have been downconverted using frequency 182 as a frequency shifter, or mixing frequency. Spectra 210 and 214 have been downconverted using frequency 176 as a frequency shifter or mixing frequency. The choice of frequency used for downconversion depends upon which of the spectra in FIGS. 3B-3D are preferred.

Additionally, the combined RF signal may be split into separate signals which are downconverted differently, as will be described more fully below with respect to FIGS. 6 and 7. Accordingly, more than one combined base band signal may be used as inputs for BSS block 150. For example, a combined base band signal as represented by spectra 202 and 206 in FIG. 3C may be one input to BSS block 150, while another combined base band signal as represented by spectra 210 and 214 in FIG. 3D may be another input to BSS block 150.

FIG. 4 shows a block diagram of one configuration of system 120 and wireless receiver 115. Antenna 123 is connected to low noise amplifier (LNA) 138. Various RF components, such as, for example, an RF filter, a duplexer or a diplexer (all not shown) may precede LNA 138. LNA amplifies the combined wireless communication signal. LNA 138 is connected to analog to digital converter (ADC) 141. ADC 141 may be a wideband ADC. ADC 141 is connected to mixer 144. Mixer 144 is also connected to local oscillator 147 which generates a local oscillator signal.

As described above with respect to FIG. 2, the order of ADC 141 and mixer 144 may be reversed. The same principle may be applied to the circuits illustrated with respect to FIGS. 5-7 as well. The various circuits will be described with the ADC before the mixer in the signal path, but the order may be reversed. In the cases where the ADC precedes the mixer, the mixer and the local oscillator operate in the digital domain.

Mixer 144 mixes the combined wireless communication signal with the local oscillator signal to produce a combined base band signal. Mixer 144 is connected to a BSS module 150.

FIG. 5 illustrates a similar receiver to that shown with respect to FIG. 4. The receiver illustrated in FIG. 5 has antenna 123, LNA 138, and ADC 141, but the output of ADC 141 is split into two signal paths for the combined wireless communication signal. Two mixers 170 and 175 are connected in the two signal paths. Mixers 170 and 175 are connected to two local oscillator sources 180 and 185. If the ADC and mixer order is reversed, the split could be after the LNA. LNA 138 could be connected to two mixers, which could each be connected to two separate ADC's.

Local oscillator sources 180 and 185 produce local oscillator signals with different frequencies from each other. The local oscillator signal produced by local oscillator source 180 might be at the carrier or center frequency of one communication type, for example, 802.11. The local oscillator signal produced by local oscillator source 185 might be at the carrier or center frequency of another communication type, for example, Bluetooth. In this way, output 190 of mixer 170 would be a signal downconverted to base band appropriately for 802.11. Since Bluetooth signals overlap in frequency with 802.11, output 190 would contain a substantial amount of Bluetooth data. However, since the Bluetooth carrier frequency is not usually exactly equal to the carrier frequency of 802.11 signals, output 190 would commonly be skewed in favor of 802.11 base band data.

As stated, the local oscillator signal produced by local oscillator source 185 might be at the center or carrier frequency of one communication type, for example, Bluetooth. In this way, output 195 of mixer 175 would be a signal downconverted to base band appropriately for 802.11. Since 802.11 signals overlap in frequency with Bluetooth, output 195 would contain a substantial amount of Bluetooth data. However, since the 802.11 carrier frequency is not usually exactly equal to the carrier frequency of Bluetooth signals, output 195 would commonly be skewed in favor of Bluetooth base band data.

As shown in FIG. 5, outputs 190 and 195 are inputs for the BSS module 150. Advantageously, outputs 190 and 195 are preprocessed by mixing with appropriate local oscillator signals. This makes the BSS even more efficient.

A further advantage is achieved in the receiver illustrated with reference to FIG. 6, which is similar to the receiver shown with reference to FIG. 5. In FIG. 6, the receiver has digital filters 200 and 204 connected to mixers 170 and 175, respectively. The digital filters 200 and 204 have appropriate bandwidths and filter shapes corresponding to the signal type of the local oscillator sources 180 and 185, respectively. For example, if local oscillator source 180 is producing a local oscillator signal having a frequency at the carrier frequency of an 802.11 signal, then digital filter 200 would have a bandwidth and filter shape corresponding to an 802.11 signal. Similarly, if local oscillator 185 is producing a local oscillator signal having a frequency at the carrier frequency of a Bluetooth signal, then digital filter 204 would have a bandwidth and filter shape corresponding to a Bluetooth signal. That a filter bandwidth or shape corresponds to a particular signal means that the filter is useful for filtering, identifying or processing the particular signal.

Advantageously, processing the combined base band signals further in filters 200 and 204 prepares the signals for the BSS process The filtering performed by filters 200 and 204 reduces the mutual interference between signals (e.g., 802.11 and Bluetooth interference with each other), making it easier for the BSS module to correctly classify and properly separate the base band signals.

Further, appropriate low pass filtering may be performed by filters 200 and 204 to select the preferred base band signal. For example, by low pass filtering, the signal producing spectrum 206 shown with respect to FIG. 3C could be selected out of the base band signal having the spectra shown with respect to FIG. 3C. Similarly, the signal producing spectrum 210 shown with respect to FIG. 3D could be selected out of the based band signal having the spectra shown with respect to FIG. 3D.

The local oscillators, mixers and filters shown with respect to FIGS. 4-7 may be controlled by CSTI module 155 or 240, similar to the way that CSTI module 155 controls the RF circuit block 127, the downconverter 130 and the ADC 133 with respect to FIG. 2.

Figure 7:
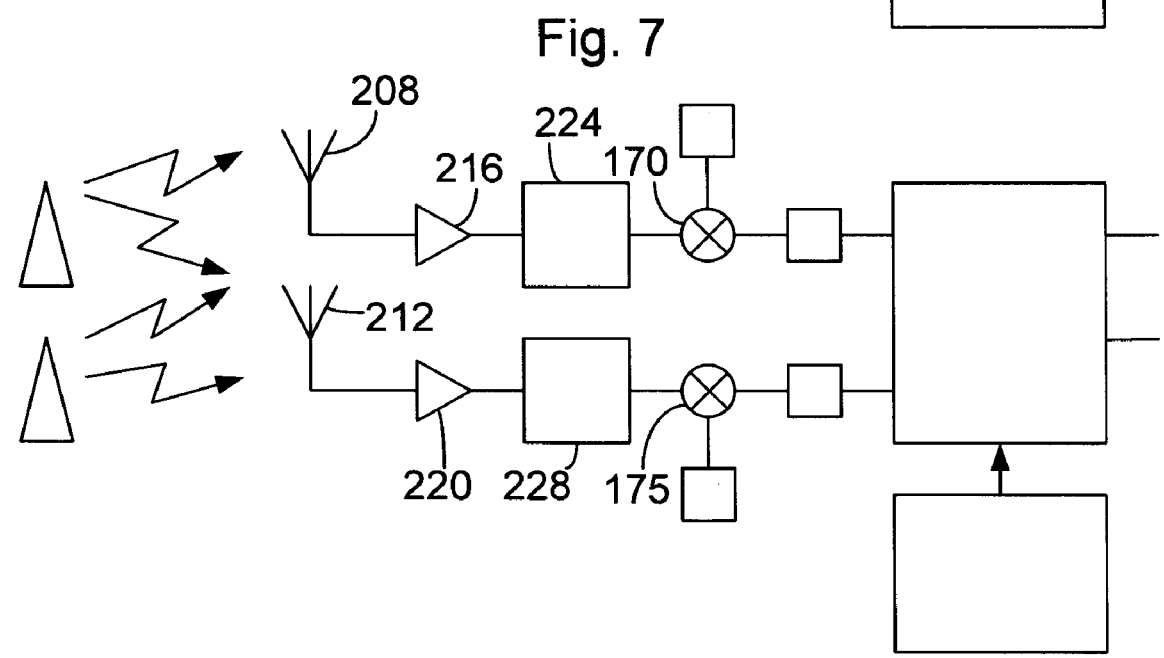

FIG. 7 illustrates a receiver similar to the receiver illustrated with respect to FIG. 6. The FIG. 7 receiver has two antennas 208 and 212. Antennas 208 and 212 are connected to LNA's 216 and 220, respectively. LNA's 216 and 220 are connected to two ADC's 224 and 228, respectively. As such, two different combined wireless communication signals are received by the two antennas 208 and 212, LNA's 216 and 220, and ADC's 224 and 228. ADC's 224 and 228 are connected to mixers 170 and 175 which perform similar functions to mixers 170 and 175 shown with respect to FIGS. 5 and 6.

The methods and devices described herein can be scaled to include more than two receive paths, resulting in more than two inputs to the BSS module. Further, as stated above, more than two outputs to the BSS module are possible. That is, the BSS can separate more than two base band sources. In some cases, the processor or processors may demodulate more than two base band signals.

Figure 8:
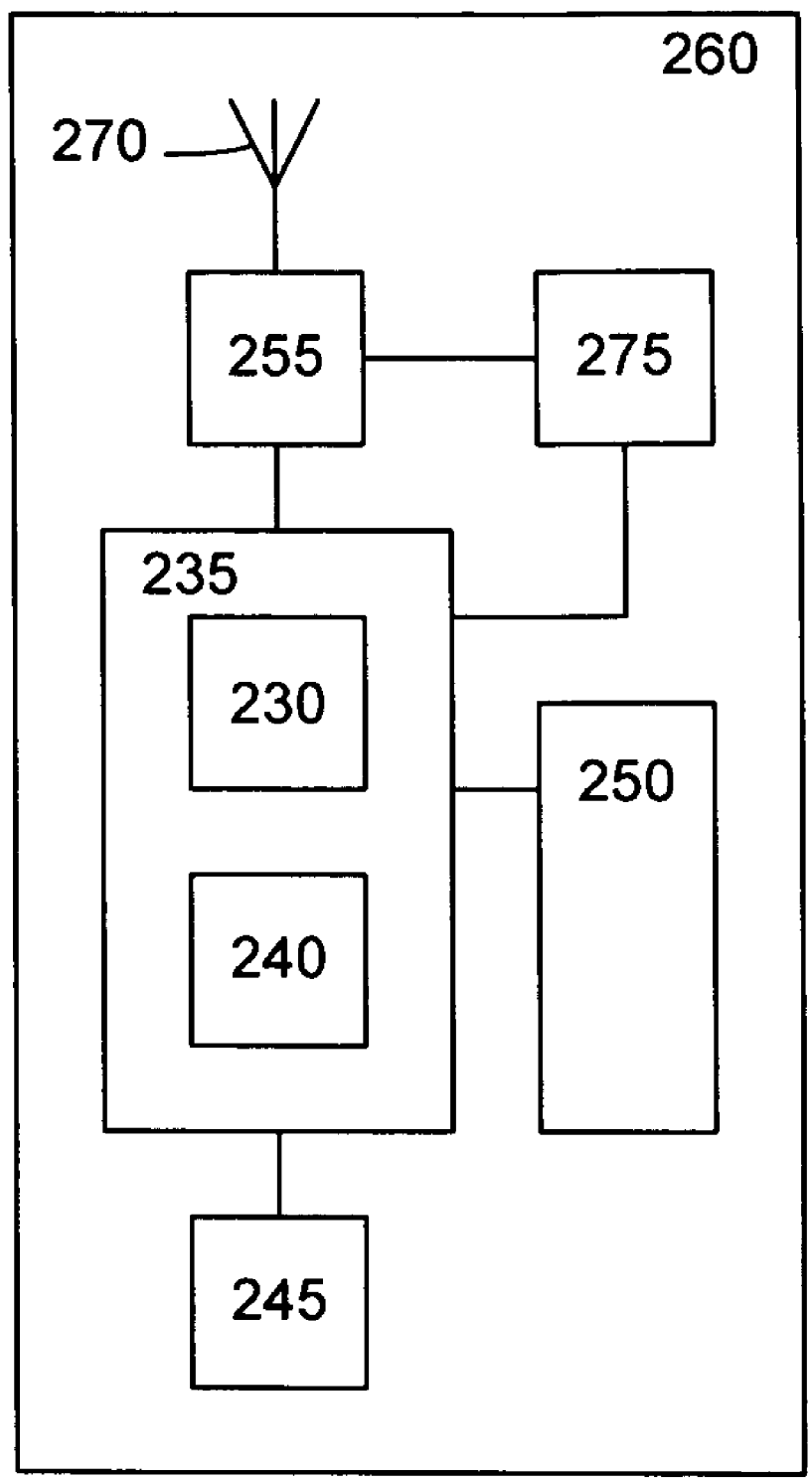
FIG. 8 shows a block diagram of a wireless communication device including a BSS module for separating at least two types of RF communication signals.

FIG. 8 is a block diagram illustrating wireless communication device 260 including BSS module 230 for separating at least two types of wireless communication signals. Wireless communication device 260 includes antenna 270 coupled to RF circuit 255. Antenna 270 is shown internal to wireless communication device 260. However, antenna 270 may be internal or external. RF circuit 255 may include an LNA, a mixer or other RF circuit components, as described with reference to FIGS. 2 and 4-7. RF circuit 255 is connected to processor 235, as described with reference to FIGS. 1-2 and 4-7. Processor 235 includes a BSS module 230 and a CSTI module 240. Processor 235 is connected to memory 245. Memory 245 may be any convenient type of memory. Memory 245 may store the code and data necessary for processor 235, BSS module 230 and CSTI module 240 to function.

Additionally, processor 235 is connected to user interface 250, possibly through a user interface module (not shown). User interface 250 may include a speaker, a microphone, a keypad, a display screen, and any other convenient user interface device. Mobile power source 275 is connected to processor 235 and to RF circuit 255 for providing power to the processor 235 and the RF circuit 255.

Further, while embodiments and implementations of the invention have been shown and described, it should be apparent that many more embodiments and implementations are within the scope of the invention. Accordingly, the invention is not to be restricted, except in light of the claims and their equivalents.

What is claimed is:

1. A method for processing a wireless communication signal, the method comprising the steps of:
   receiving a combined wireless communication signal, the combined wireless communication signal having at least two component wireless communication signals, the component wireless communication signals differing from each other in at least one of the following ways: having different center or carrier frequencies, having different bandwidths, having different modulation schemes, having different access schemes, and having different wireless communication resources;
   splitting the received signal into a first branched signal and a second branched signal;
   converting the combined wireless communication signal to a combined base band signal by mixing the first branched signal with a first carrier frequency signal and mixing the second branched signal with a second carrier frequency signal, the first and second carrier frequency signals having center or carrier frequencies indicative of the at least two component wireless communication signals;
   performing blind source separation (BSS) analysis based on the converted base band signal; and
   outputting at least two different base band signals representing the at least two component wireless communication signals.

2. The method of claim 1, further comprising the step of:
   converting the combined wireless communication signal from a radio frequency (RF) analog signal to an RE digital signal.

3. The method of claim 1, further comprising the step of:
   filtering the combined base band signal with a first filter bandwidth proportional to a first bandwidth of a first component signal.

4. The method of claim 3, further comprising the step of:
   filtering the combined base band signal with a second filter bandwidth proportional to a second bandwidth of a second component signal.

5. The method of claim 1, wherein the step of performing blind signal source analysis comprises the step of:
   performing independent component analysis.

6. The method of claim 5, wherein the independent component analysis includes a maximum likelihood analysis.

7. A computer readable medium embodying instructions for performing a method for processing a wireless communication signal, the method comprising the steps of:
   receiving a combined wireless communication signal, the combined wireless communication signal having at least two component wireless communication signals, the component wireless communication signals differing from each other in at least one of the following ways: having different center or carrier frequencies, having different bandwidths, having different modulation schemes, having different access schemes, and having different wireless communication resources;
   splitting the received signal into a first branched signal and a second branched signal;
   converting the combined wireless communication signal to a combined base band signal by mixing the first branched signal with a first carrier frequency signal and mixing the second branched signal with a second carrier frequency signal, the first and second carrier frequency signals having center or carrier frequencies indicative of the at least two component wireless communication signals;

performing blind source separation (BSS) analysis based on the converted base band signal; and outputting at least two different base band signals representing the at least two component wireless communication signals.

8. The computer readable medium of claim 7, the method further comprising the step of:

converting the combined wireless communication signal from a radio frequency (RF) analog signal to an RF digital signal.

9. The computer readable medium of claim 7, the method further comprising the step of:

filtering the combined base band signal with a first filter bandwidth proportional to a first bandwidth of a first component signal.

10. The computer readable medium of claim 9, the method further comprising the step of:

filtering the combined base band signal with a second filter bandwidth proportional to a second bandwidth of a second component signal.

11. The computer readable medium of claim 7, wherein the step of performing blind signal source analysis comprises the step of:

performing independent component analysis.

12. The computer readable medium of claim 11, wherein the independent component analysis includes a maximum likelihood analysis.

13. A wireless communication signal receiver comprising:

a blind source separation (BSS) module configured to separate at least a first type base band signal and a second type base band signal;

a first analog to digital converter connected to the BSS module;

a second analog to digital converter connected to the BSS module;

a first downconverter connected to the first analog to digital converter, the first downconverter comprising a first complex mixer;

a second downconverter connected to the second analog to digital converter, the second downconverter comprising a second complex mixer;

an antenna connected to the first and second downconverters, wherein the antenna is configured to receive at least a first type RF signal corresponding to the first type base band signal and a second type RF signal corresponding to the second type base band signal.

14. The wireless communication signal receiver of claim 13, wherein the first and second analog to digital converters precedes the first and second downconverters in a receive signal path.

15. A wireless communication signal receiver comprising:

means for performing blind source separation (BSS) to separate at least a first type base band signal and a second type base band signal;

first means for converting a combined analog signal to a combined digital signal, connected to the means for performing BSS;

second means for converting the combined analog signal to the combined digital signal, connected to the means for performing BSS:

first means for downconverting a combined RF signal to a combined base band signal, connected to the first means for converting the combined analog signal to the combined digital signal, the first downconverting means comprising first means for complex mixing the combined RF signal second means for downconverting the combined RF signal to the combined base band signal, connected to the second means for converting the combined analog signal to the combined digital signal, the second downconverting means comprising a second means for complex mixing the combined RF signal;

means for receiving the combined RF signal over the air connected to the first and second means for downconverting the combined RF signal to the combined base band signal, wherein the combined RF signal comprises at least a first type RF signal corresponding to the first type base band signal and a second type RF signal corresponding to the second type base band signal.

* * * * *